Figure 1:
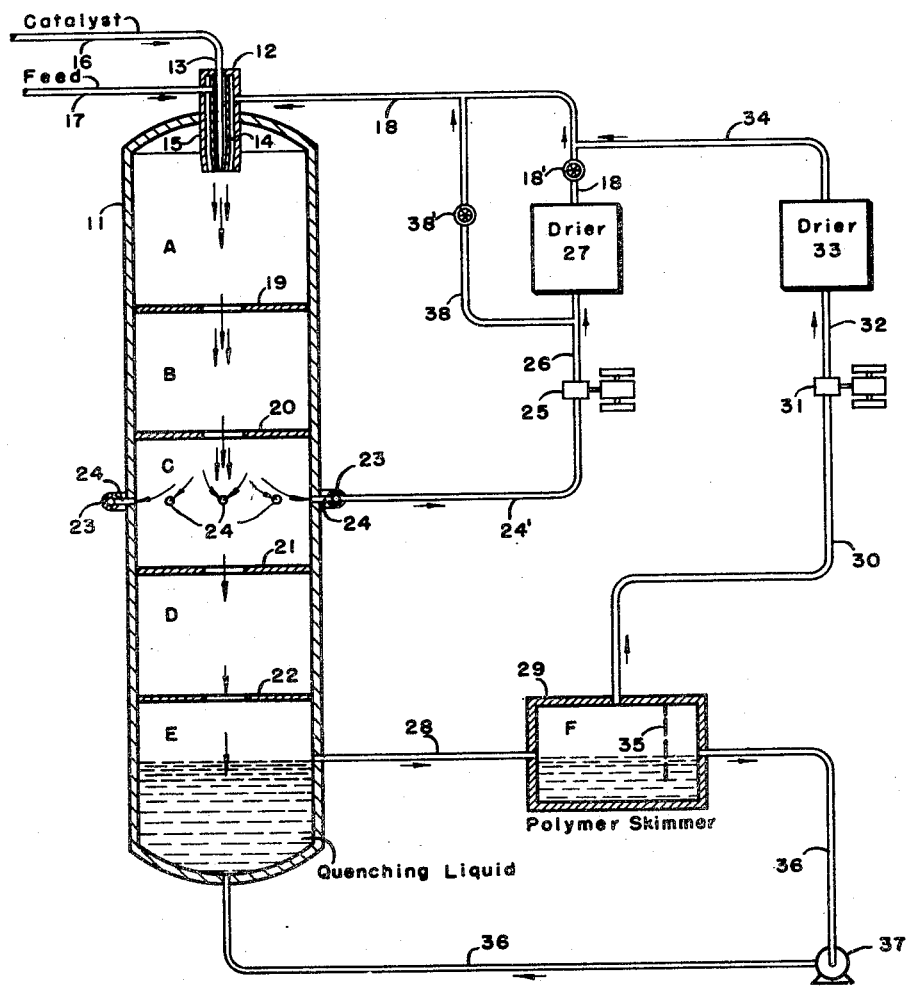

Patented Dec. 5, 1950

2,533,058

UNITED STATES PATENT OFFICE 2,533,058

METHOD FOR POLYMERIZING OLEFINS

Sherman S. Shaffer, Baytown, and Bradshaw F. Armendt, Pelly, Tex., assignors to Standard Oil Development Company, a corporation of Delaware Application November 23, 1944, Serial No. 564,810

9 Claims. (Cl. 260—85.3)

The present invention is directed to a method for reacting hydrocarbons to produce a vulcanizable product.

More particularly, the present invention is directed to reacting hydrocarbons wherein a stream of hydrocarbons and a stream of a solution of fluid catalyst are brought into contact in space under such conditions as to form a polymer.

It is known to polymerize olefins, such as isobutylene, or a mixture of olefins and diolefins, such as isobutylene and butadiene, in the presence of a Friedel-Crafts metallic halide catalyst. As an example of such a process the polymer known as butyl rubber is often produced by reacting an admixture of isobutylene and butadiene or isoprene in the presence of a metallic halide, such as aluminum chloride or boron trifluoride. The reaction may be conducted continuously at low temperatures in a dilute solution using methyl chloride as a diluent. Other alkyl halides may be employed as solvents or diluents for the reagents.

When reacting the olefins or mixture of olefins and diolefins in the presence of a Friedel-Crafts metallic halide catalyst, it is necessary to employ a special technique in order to obtain a polymer product having the desired characteristics. It has been found advantageous to admix the hydrocarbon feed stock and catalyst at an extremely rapid rate and to allow the admixture to react in free space. If a polymer is formed before the reactants come into contact with a metallic surface they do not have an opportunity to accumulate on the surface of the equipment with resultant progressive clogging or plugging of the equipment. A desirable arrangement for mixing the hydrocarbon feed stock and catalyst and discharging it in a free space within a reaction vessel is by the use of a "jet reactor" which is an arrangement of concentric nozzles by which a stream of hydrocarbons and a stream of fluid catalyst are brought into contact in space. Such jet reactors are known to the art, and a desirable arrangement is disclosed in U. S. Patent application Serial No. 491,028, filed in the name of John D. Calfee et al. on June 16, 1943, now Patent 2,491,710. It is conventional to arrange one or more jet reactors in a relatively large reaction zone with the reactant mixture produced by the jet or jets first projected into free space where a polymer is allowed to form and with a quenching zone, containing a quenching liquid, such as warm water or alcohol, arranged into which the polymer is quenched in order to terminate the polymerization reaction and obtain a polymer of the desired characteristics.

It is an object of the present invention to provide an improved process for obtaining polymer wherein a stream of hydrocarbon feed stock and a stream of fluid catalyst are brought into contact to form a resultant stream wherein spraying or misting of the streams is greatly reduced or prevented.

More specifically, it is an object of the present invention to polymerize hydrocarbons including the steps of forming a stream by contacting a stream of olefin-containing feed stock with a stream of Friedel-Crafts metallic halide catalyst, the two streams flowing substantially concurrently before admixture and the resultant liquid stream being surrounded by a concentric stream of gas flowing at substantially the same velocity as the liquid stream to prevent spattering or misting of the liquid stream.

In the process of the present invention a stream of chilled feed hydrocarbon, which is preferably in the form of a solution of olefins in methyl chloride or a solution of olefin and diolefin in methyl chloride, is brought into contact in space with a chilled solution of Friedel-Crafts metallic halide catalyst, such as a solution of aluminum chloride in methyl chloride, and the two streams admixed to form a resultant liquid stream and the resultant stream of reactants surrounded with a concentric mass of gas moving in the same direction as the liquid stream and with substantially the same velocity for a sufficient interval of time to allow the polymerization reaction to proceed substantially as far as desired in order to produce a polymer of the desired characteristics. The stream of liquid reactants is kept from spattering or misting by the concentric mass of gas and prevents deposition of polymer on the sides of the vessel defining the reaction zone. After the reactants have been allowed to polymerize in the free space, the major portion of the concentric mass of gas is removed from the reaction zone and the reactants discharged into a quenching zone.

In the practice of the present invention, it is preferred to employ an elongated reaction vessel, to discharge the stream of reactants surrounded by a concentric stream of gas into one end of the vessel, to maintain a second zone of lower pressure some distance from the point at which the liquid reactants are admixed and along the axis of the stream of the reactants and to withdraw the major portion of the blanketing concentric mass of gas from the reaction zone at this point and to maintain in a third zone at a lower pressure than the second zone a quenching liquid for quenching the polymer and to remove from the third zone the remaining portion of the blanketing gas as well as vapors from the quenching liquid.

Figure 2:
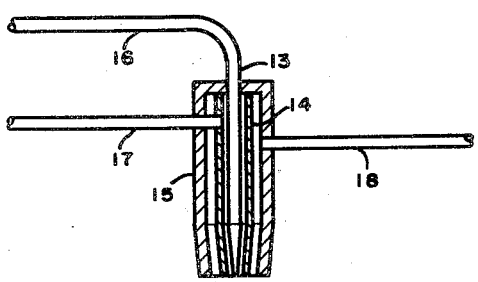

Other objects and advantages of the present invention may be seen from a reading of the following description taken with the drawing in which Fig. 1 shows an embodiment suitable for carrying out the present invention and Fig. 2 is a fragmentary view showing in greater detail a nozzle arrangement suitable for use in the embodiment of Fig. 1.

Turning now to the drawing, it will be seen that an elongated reaction vessel 11 is provided with an assembly of nozzles 12 in the upper end of the vessel and pointed downwardly so that the axis of the stream projecting from the plurality of nozzles 12 lies approximately along the vertical axis of vessel 11.

The assembly of nozzles is shown in greater detail in Fig. 2. These nozzles include an inner tube 13 and a second tube 14 concentric with tube 13 and an outer tube 15 concentric with the other tubes. Tube 13 is connected with inlet line 16 which serves to supply liquid catalyst to the reaction vessel. A second tube 14 is connected through inlet line 17 to supply a mixture of hydrocarbon feed stock to the reactor. An inlet line 18 is arranged to supply gas to the space between concentric tubes 14 and 15.

It will be seen that the assembly 12 is arranged in the upper end of vessel 11 and fluids passed into assembly 12 are discharged downwardly into vessel 11. The streams of liquid passed into nozzle assembly 12 through inlet lines 16 and 17 are caused to flow in a parallel direction and these two streams are mixed intimately in space to form a resultant liquid reactant stream. In the nozzle assembly a gaseous stream is also formed with its direction of flow parallel with the flow of the two liquid streams and this gaseous stream is formed so that it is concentric with and surrounds the resultant reaction stream and has substantially the same velocity as the resultant stream.

Vessel 11 is divided into a plurality of zones by a series of baffles 19, 20, 21 and 22. Each of the baffles is in the shape of an annulus with an opening through the center of the annulus sufficiently large to allow the stream of reactants and gas to flow downwardly through the vessel. The baffle extending laterally across the vessel divides it into a plurality of zones which are designated, reading from the top to the bottom of the vessel, as zones A, B, C, D and E. Vessel 11 is arranged to have a pool of quenching liquid maintained in the lower portion thereof and such a pool of liquid is indicated by shading in the lower end of the vessel immediately below zone E.

A conduit 23 is arranged in the form of a ring around vessel 11 adjacent zone C with a plurality of outlet lines 24 connected to the wall of the vessel and fluidly connecting zone C with conduit 23 which serves as a gas collecting ring. Conduit 23 is connected to line 24' which discharges into compressor 25. The gas passes from compressor 25 through line 26 and into drier 27 and is discharged from the drier into line 18 which serves to return the dried gases to the nozzle assembly 12.

A conduit 28 is arranged to withdraw from a lower portion of vessel 11 a side stream which includes both liquid from the pool of quenching liquid and gases from the zone E. Conduit 28 discharges into a vessel 29 which is arranged to separate into fractions the quenching liquid, polymer and gases withdrawn from vessel 11 by conduit 28. The gases and vapors collect in the upper portion of vessel 29, which is designated as zone F, and are removed from this zone through line 30. The gases and vapors from line 30 are compressed in compressor 31, pass through line 32 to drier 33 and are discharged through line 34 to line 18 to be returned to vessel 11. A vertically arranged screen 35 is placed in vessel 29 to act as a polymer skimmer. A mixture of polymer and quenching liquid is accumulated in the lower portion of vessel 29. The quenching liquid passes through screen 35, is withdrawn through line 36 containing pump 37 and is returned to the pool of quenching liquid in the bottom of tower 11. The polymer separated by screen 35 may be withdrawn from vessel 29 by any conventional means, such as a screw conveyer.

The compressors 25 and 31 are operated so that zone C is at a substantially lower pressure than zone A, and zones E and F at a pressure substantially below that of zone C. By arranging the pressure differential in this manner, the major portion of the gas blanketing the reactant stream is removed from zone C but a small portion of the gas passes on to zone E and this gas, along with vapors leaving the pool of quenching liquid, is withdrawn from zone E by conduit 28 and passed from zone F into line 30 and to compressor 31. With such an arrangement the major portion of the gas used for blanketing the stream of reactants is maintained quite dry and requires only a small amount of drying in vessel 27. On some occasions, it may be desirable to by-pass drier 27 and this may be done by opening valve 38' in by-pass line 38 and closing valve 18' in line 18. The minor portion of gases removed from zone F contain a substantial portion of vapors and require a substantial amount of drying in vessel 33.

In the operation of the present method, it will be understood that the liquid catalyst discharged through inlet line 16 into nozzle assembly 12 is chilled, in accordance with the usual operation of a jet reactor, to a temperature in the range of $-120°$ to $-160°$ F. Similarly, the olefinic feed stock discharged by inlet 17 into the nozzle assembly 12 is chilled to a temperature in the range of approximately $-120°$ to $-160°$ F. It will be understood that although in the drawing the liquid catalyst is shown as discharged into inner jet 13 and the olefinic feed as discharged into the space between tubes 13 and 14, the position of these two reactant materials may be reversed and olefinic feed stock may be passed into reaction vessel 11 by means of inlet line 16 and tube 13 and liquid catalyst may be passed into the reaction vessel by inlet line 17. In any event, a stream of chilled liquid catalyst and a stream of chilled olefinic feed stock are admixed to form a resultant stream which has an axis or direction of flow parallel with the axis of reaction vessel 11 and this stream is blanketed by the mass of gas passed into the vessel 11 through inlet line 18 and into the space between nozzles 14 and 15.

The stream of gas concentric with the stream of reactants moves with approximately the same velocity as the stream of liquid reactants and prevents the spattering or misting of the reactant stream. The velocity of the reactant stream and the size of the reaction vessel 11 are proportioned so that by the time the reactant stream enters zone C polymer has been formed in the stream of reactants and at least a major portion of the blanketing stream of gas may be removed from the stream of reactants without danger of polymer building up on the walls of the reaction vessel. Accordingly, the major portion of the blanketing gas is removed from reaction vessel 11 in zone C by means of radially extending tubes 24 and collecting ring 23. The remaining gases and the reactant stream pass from zone C through zone D and into zone E where the reactants enter the pool of quenching liquid and the polymerization reaction is terminated to produce a polymer of the desired characteristics.

A slurry of polymer and quenching liquid passes through outlet line 28 to vessel 29 where the polymer is removed from the quenching liquid through screen 35 and the quenching liquid then recycled to vessel 11. It will be understood that as polymer accumulates in vessel 29, it may be removed by suitable means, such as by a screw conveyor, not shown in the drawing. Gas is removed from gas collecting ring 23 and from zone F in vessel 29, recompressed, dried and returned to vessel 11.

It will be seen that until immediately before the reactants enter the pool of quenching liquid, the direction of flow of the blanketing gas is parallel with the flow of the liquid reactants. In other words, the direction of flow of the blanketing gas stream is not only parallel with the direction of flow of the reactant stream in zone A and B but in zone C gas is removed by the collecting ring 23 so that the direction of flow of the gas remaining in the vessel is not substantially altered and continues parallel with the longitudinal axis of reaction vessel 11 in zone D and into zone E.

It will be seen that the operation carried out in vessel 11 may be said to include two steps. As a first step the chilled liquid streams, including olefins and the chilled liquid stream containing metal halide catalyst, are combined to form a resultant liquid stream of reactants which is surrounded by a stream of gas flowing at substantially the same velocity as the liquid resultant stream. The resultant stream passes through space surrounded by the gas until a substantial amount of polymer is formed therein. As a second step the reactant stream is quenched by bringing it into intimate contact with a quenching liquid while the gas is removed so that it will not interfere with the flow of the liquid stream of reactants surrounded by the concentric stream of gas. The second step is carried out at a pressure substantially lower than the first step in order to insure the removal of gases from the second step at a sufficiently rapid rate to prevent any interference with the first step and in order to insure the absence of quenching liquid vapors in the first step. For convenience in carrying out these steps it is desirable to employ a reaction vessel having at least three zones with the mixing of the streams of reactant liquids surrounded by a concentric stream of gas and the formation of a substantial amount of polymer in the first zone, the removal of a major portion of the surrounding stream of gas in a second zone and the quenching of the reactants and the removal of the remaining gas in a third zone. In other words, an elongated reaction vessel divided by baffles into three zones and arranged to maintain the highest pressure in the first zone, a lower pressure in the second zone and a still lower pressure in the third zone may be employed; such a vessel would correspond to vessel 11 but including only zones A, C and E. It is preferred, however, to provide a vessel with at least five zones as shown in the drawing with the reactants and the stream of gas discharged into a first zone, a major portion of the gas removed from the third zone and the remaining gas removed and quenching conducted in the fifth zone, with a second zone between the first and third zones and a fourth zone between the third and fifth zones in order to maintain more effectively the pressure differential between the first and third zones and between the third and fifth zones.

A number of gases may advantageously be used for the purpose of forming the concentric mass of gas around the stream of liquid reactants. Suitable gaseous materials may be hydrogen, methane, ethane, ethylene or mixtures thereof. If desired, these gaseous blanketing agents may be chilled by conventional refrigerating equipment before they are discharged into vessel 11. The liquids employed in the quenching zone may be those conventional to the art. At the present time, water and alcohol are the liquids usually employed as quenching agents. The amount and temperature of the quenching liquid employed may be varied over a very wide range but usually it is desirable to employ a large excess of quenching liquid at a temperature no lower than atmospheric.

Having fully described and illustrated the practice of the present invention, what we desire to claim is:

1. A method of polymerizing olefins comprising the steps of admixing a chilled liquid stream including Friedel-Crafts metallic halide catalyst and a chilled liquid stream including olefin to form a resultant stream under conditions to cause the formation of polymer, passing the resultant stream of reactants through a first zone to form polymer in said first stream while in said zone, forming a concentric stream of gas moving in the same direction and at approximately the same velocity as the liquid stream around the liquid stream of reactants immediately upon the formation of said stream, passing the stream of liquid reactants and the concentric stream of gas into a second zone maintained at a pressure substantially below the pressure of the first zone, removing a major portion of the concentric gaseous stream in said second zone, passing the liquid reactants and the remaining gases into a third zone maintained at a pressure below the second zone, and quenching the reactants in the third zone.

2. A method in accordance with claim 1 in which the olefin is isobutylene.

3. A method in accordance with claim 1 in which the olefin is a mixture of isobutylene and isoprene.

4. A method of polymerizing olefins including the steps of causing a first chilled liquid stream including Friedel-Crafts metallic halide catalyst to flow substantially parallel with a second chilled liquid stream including olefin, admixing the two streams in space in a first zone to form a resultant stream having a direction of flow substantially parallel with the direction of flow of the first and second streams and maintained under conditions to cause the formation of polymer in said zone, forming a stream of gas having a direction of flow parallel with the first and second liquid streams at a velocity approximately equal to the velocity of the resultant stream and surrounding the two liquid streams while being admixed and the resultant stream with said gaseous stream and maintaining the gaseous stream concentric with the resultant stream in the first zone, passing the resultant liquid stream and the concentric gas stream without a substantial change of direction into a second zone maintained under a pressure substantially below the pressure of the first zone, removing a major portion of the gas comprising the gaseous stream from the second zone, passing the resultant liquid stream and the remaining gas without substantial change of direction from the second zone to a third zone, intimately mixing the liquid stream with quenching liquid in the third zone and removing the remainder of the gas comprising the gaseous stream from the third zone.

5. A method in accordance with claim 4 in which the olefin is isobutylene.

6. A method in accordance with claim 4 in which the olefin is a mixture of isobutylene and isoprene.

7. A method of forming polymer comprising the steps of forming a first chilled liquid stream including Friedel-Crafts metallic halide catalyst and alkyl halide, forming a second chilled liquid stream including isobutylene concentric with the first liquid stream, forming a stream of gas concentric with the second liquid stream, projecting the first and second liquid streams in space in a first zone intimately admixing them to form a resultant liquid stream under conditions to form polymer in the resultant stream while within the first zone, surrounding the first and second liquid streams on admixture and the resultant stream with the concentric gas stream moving in the same direction and at approximately the same velocity as the resultant liquid stream, passing the resultant liquid stream and the concentric gas stream into a second zone maintained at a pressure substantially less than the first zone without substantially altering the direction of flow of the resultant liquid stream and the gas stream, removing a major portion of the gas from the concentric gas stream in the second zone, passing the resultant liquid stream and the remainder of the gas stream into a third zone without substantially changing the direction of flow of the resultant liquid stream, intimately admixing the resultant liquid stream with quenching liquid in the third zone to terminate rapidly the polymerization reaction and removing the remainder of the gas in the gaseous stream from the third zone.

8. A method in accordance with claim 7 in which a fourth zone is interposed between the first and second zone and a fifth zone is interposed between the second and third zones and in which the stream of reactants surrounded by the stream of gas flows from the first through the fourth to the second zone without substantial change in direction and in which the resultant liquid stream and remainder of the gas in the gaseous stream flows from the second through the fifth to the third zone without substantial change in direction of the resultant liquid stream.

9. A method in accordance with claim 7 in which the gas withdrawn from the second zone is compressed and dried to form a first fraction and in which the gas withdrawn from the third zone is compressed and dried to form a second fraction and in which the first and second fractions are returned to the first zone to form the concentric stream of gas.

SHERMAN S. SHAFFER.
BRADSHAW F. ARMENDT.

REFERENCES CITED

The following references are of record in the file of this patent:

UNITED STATES PATENTS

| Number | Name | Date |
| --- | --- | --- |
| 2,276,893 | Thomas | Mar. 17, 1942 |
| 2,280,802 | Depew | Apr. 28, 1942 |
| 2,375,256 | Soday | May 8, 1945 |